US006221282B1

(12) United States Patent van Konynenburg

(10) Patent No.: US 6,221,282 B1
(45) Date of Patent: Apr. 24, 2001

(54) ELECTRICAL DEVICES COMPRISING CONDUCTIVE POLYMER COMPOSITIONS

(76) Inventor: Peter H. van Konynenburg, 739 Coastland Dr., Palo Alto, CA (US) 94303

( * ) Notice: Subject to any disclaimer, the term of this patent is extended or adjusted under 35 U.S.C. 154(b) by 0 days.

(21) Appl. No.: 06/282,547

(22) Filed: Jul. 13, 1981

Related U.S. Application Data

(60) Division of application No. 06/075,413, filed on Sep. 14, 1979, now Pat. No. 4,304,987, which is a continuation-in-part of application No. 05/943,659, filed on Sep. 18, 1978, now abandoned.

(51) Int. Cl.[7] ................................ H01B 1/24; C08K 3/04
(52) U.S. Cl. ............................................ 252/511; 524/496
(58) Field of Search ............................ 252/511; 524/496, 524/495; 219/528; 338/212, 22 R

(56) References Cited

U.S. PATENT DOCUMENTS

| | | | | |
|---|---|---|---|---|
| 2,559,077 | | 7/1951 | Johnson et al. | 219/543 |
| 3,976,600 | * | 8/1976 | Meyeo | 252/511 |
| 4,017,715 | | 4/1977 | Whitney et al. | 219/553 |
| 4,085,286 | | 4/1978 | Horsma et al. | 194/92 |
| 4,177,376 | * | 12/1979 | Horsma et al. | 252/511 |
| 4,188,276 | | 2/1980 | Lyons et al. | 252/511 |
| 4,223,209 | * | 9/1980 | Diaz | 252/511 |
| 4,277,673 | * | 7/1981 | Kelly | 252/511 |
| 4,388,607 | | 6/1983 | Toy | 338/225 D |

FOREIGN PATENT DOCUMENTS

| | | |
|---|---|---|
| 1532350 | 11/1978 | (GB) . |
| 2012149 | 7/1979 | (GB) . |
| 2014784 | 8/1979 | (GB) . |
| 2024557 | 1/1980 | (GB) . |
| 1529354 | 10/1980 | (GB) . |

OTHER PUBLICATIONS

Verhelst et al. Rubber Chemistry and Techology 50, pp. 735–745 (1977).

Research Disclosure 13634, Use of the Electroconductive carbon Ketjenblack EC, Aug. 1975.

Klason and Kubat, J. Appl. Polymer Science, vol. 19, pp. 831–845 (1975).

Schubert et al, "Analysis of Carbon Black," Encyclopaedia of Industrial Chemical Analysis (1969), vol. 8, pp. 179–243.

Cities Services Co. Trade Publication, "Industrial Carbon Black." No Date/No Pub. Info.

Garret, Kunstoffe 67 (1977), pp. 38–40.

Verhelst "Antistatic and/or Conductive Polymers Filled with Carbon Black," Kunstoffe 66 (176), 701–703 No Date.

"Cabot Carbon Black Pigments" Jul. 1958, vol. 11, No. 1.

Research Disclosure, "13634, Use of the Electro–Conductive Carbon Ketjenblock E C (C08K3/07)" Aug. 1975.*

Klason and Kubat, "Journal of Applied Polymer Science", vol. 19, pp. 831–845, 1975.*

* cited by examiner

*Primary Examiner*—Mark Kopec

(57) ABSTRACT

Electrical devices which comprise a PTC element composed of a PTC conductive polymer composition and a contiguous CW element composed of a conductive polymer composition which comprises an organic thermoplastic polymer and a conductive carbon black having a particle size (D) in millimicrons and surface area (S) in $m^2/g$ such that S/D is at least 10. D is preferably less than 27 millimicrons, especially less than 18 millicrons. S/D is preferably at least 12, especially at least 18. Particularly useful devices are in the form of heaters.

4 Claims, 5 Drawing Sheets

ELECTRICAL DEVICES COMPRISING CONDUCTIVE POLYMER COMPOSITIONS

CROSS-REFERENCE TO RELATED APPLICATION

This application is a division of application Ser. No. 06/075,413 filed on Sep. 14, 1979, now U.S. Pat. No. 4,304,987, which is a continuation-in-part of my application Ser. No. 05/943,659, now abandoned filed Sep. 18, 1978, now abandoned, the disclosure of which is incorporated herein by reference.

BACKGROUND OF THE INVENTION

1. Field of the Invention

This invention relates to electrical devices comprising conductive polymer compositions.

2. Summary of the Prior Art

Conductive polymer compositions comprising a conductive carbon black dispersed in a polymer are well known. Over recent years, there has been particular interest in such compositions which exhibit positive temperature (PTC) characteristics, i.e. which show a very rapid increase in resistivity over a particular temperature range. Reference may be made for example to U.S. Pat. Nos. 2,978,665; 3,243,753; 3,351,882; 3,412,358; 3,413,442; 3,591,526; 3,673,121; 3,793,716; 3,823,217; 3,858,144; 3,861,029; 3,914,363, and 4,017,715; 4,177,376, 4,177,446, 4,246,468, 4,388,607, 4,421,582, 4,426,339 and 4,534,889. British Patent No. 1,409,695; Brit. J. Appl. Phys. Series 2, 2 569-576 (1969, Carley Read and Stow); Kautschuk und Gummi II WT, 138–148 (1958, de Meij); Polymer Engineering and Science, Nov. 13, 1973, No. 6, 462–468 (J. Meyer); U.S. Patent Office Defensive Publication No. T 905,001; and commonly assigned U.S. patent application Ser. No. 601,639. The disclosure of each of the above patents and applications is incorporated herein by reference.

PTC compositions are useful, inter alia, in electrical devices comprising a PTC element in combination with another resistive element whose resistance remains relatively constant at least up to the temperature range in which the PTC element shows a very rapid increase in resistance, such other element being referred to be as a constant wattage (CW) [or relatively constant wattage (RCW)] element. It is to be noted that the resistance of a CW element need only be relatively constant in the temperature range of normal operation; thus it can decrease, remain constant, or increase slowly in this range, and can exhibit PTC characteristics above normal operating temperatures of the device. Such devices are described for example in U.S. Pat. No. 4,017,715 and German Offenlegungschrift Nos. 2,543,314.1 and 2,903,442.2. In order to obtain the best results from such devices, it is necessary that the resistivities of the PTC and CW elements should be correlated throughout the temperature range of operation and in many cases that the resistivity/temperature characteristics of the elements and the contact resistance between the elements (whether bonded directly to each other, as is generally preferred, or through a layer of a conductive adhesive) should not change excessively on storage or in use, eg. due to temperature variations which take place during operation of the device. The CW compositions hitherto available are not fully satisfactory in these respects. For example, it is well known that certain conductive polymer compositions comprising an elastomer and a carbon black exhibit CW behavior, but unfortunately the resistivity of such compositions is excessively dependent on their thermal history.

SUMMARY OF THE INVENTION

I have now discovered that improved electrical devices comprise, (a) a CW element composed of a CW composition which comprises (i) a continuous phase of a first organic thermoplastic polymer and (ii) a first conductive carbon black, said first conductive carbon black having a particle size (D) in millimicrons and a surface area (S) in $m^2/g$ such the S/D is at least 10;

(b) a PTC element composed of PTC composition which comprises (i) a continuous phase of a second organic polymer and (ii) a second conductive carbon black; and (c) at least two electrodes which are connectable to a source of electrical power and which are so placed in the device that, when they are connected to a source of electrical power, current flows through the device along a path which, at least at some temperatures, passes sequentially through said PTC element and said CW element.

BRIEF DESCRIPTION OF THE DRAWINGS

The invention is illustrated in the accompanying drawings, in which.

Figure 1:
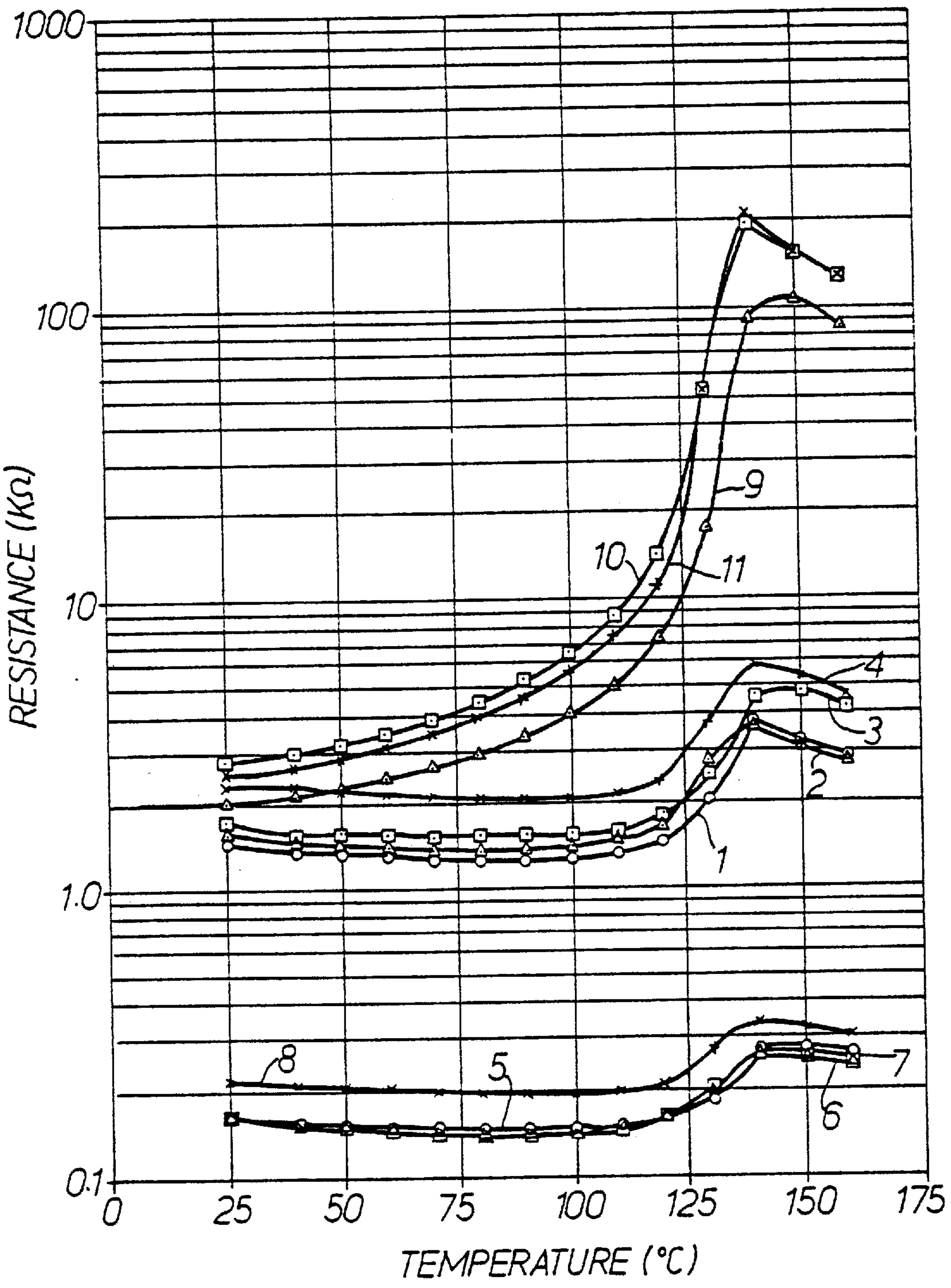
FIGS. 1 to 4 show the resistance/temperature characteristics of CW compositions as used in the invention and as further described below.
Figure 2:
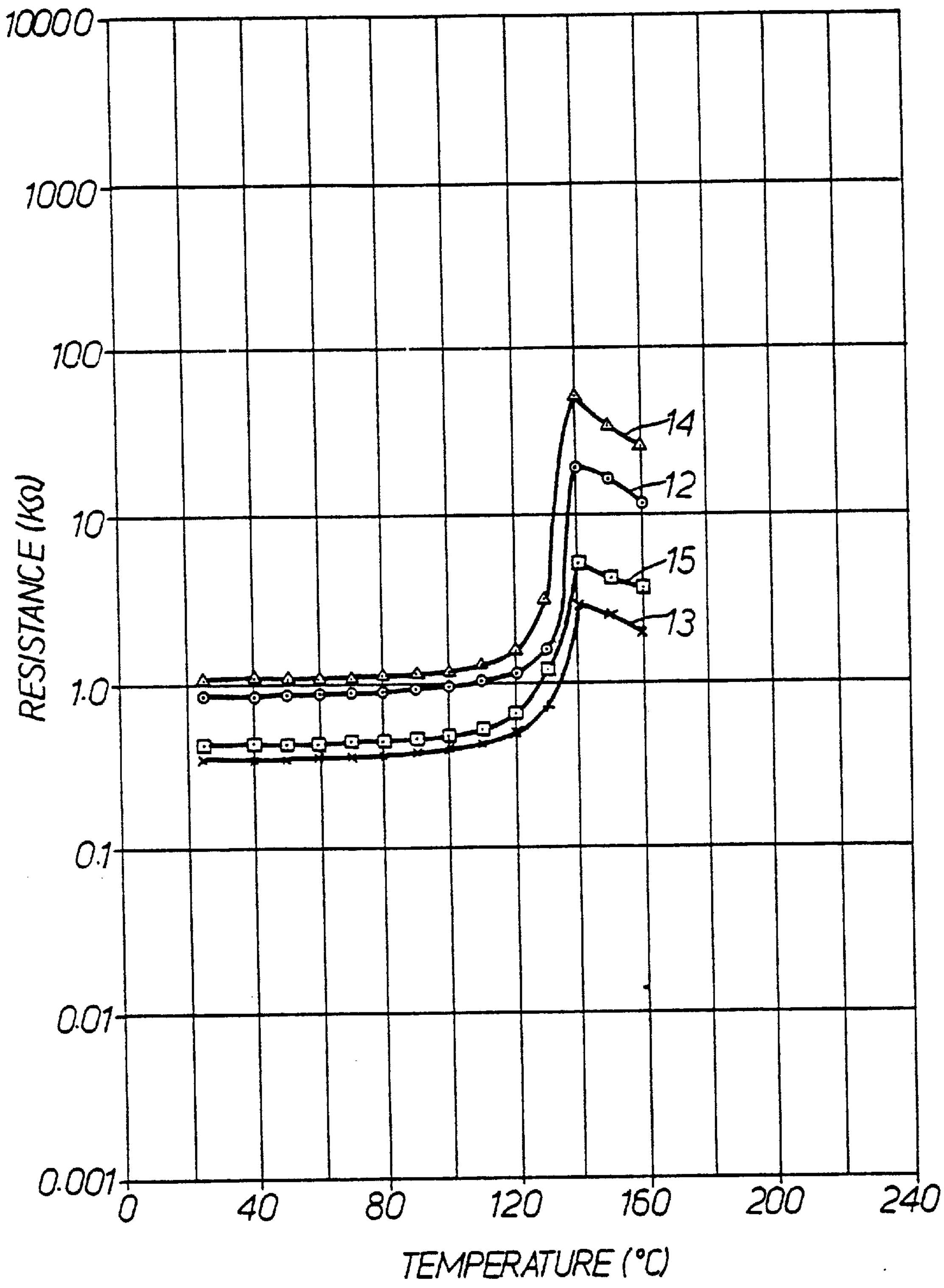

The CW compositions used in the devices of the invention contain a carbon black whose particle size (D) in millimicrons and surface area (S) in $m^2/g$ are such that the ration S/D is at least 10, preferably at least 12, especially at least 18. S and D are measured by methods well known to those skilled in the art and described in "Analysis of Carbon Black" by Schubert, Ford and Lyon, Vol. 8, Page 179, Encyclopaedia of Industrial Chemical Analysis (1969), published by John Wiley and Son, New York. D is preferably less than 27, especially less than 18, particularly less than 15 millimicrons. Particularly useful CW compositions contain carbon blacks having a particle size of at most 15 millimicrons and a surface area of at least 300, preferably at least 500, especially at least 700, $m^2/g$. Examples of suitable carbon blacks which are commercially available include the following:

| Trade Name | S | D | S/D |
|---|---|---|---|
| Monarch 1300 | 560 | 11 | 51 |
| Raven 8000 | 935 | 13 | 72 |
| Super Spectra | 742 | 13 | 57 |
| Monarch 1100 | 240 | 13 | 18 |
| FW 200 | 460 | 13 | 35 |
| Raven 7000 | 543 | 14 | 39 |
| Raven 3500 | 319 | 16 | 20 |
| Ketjenblack EC | 1000 | 30 | 33 |
| Royal Spectra | 1125 | 10 | 112.5 |

It should be noted that, with the exception of Ketjenblack EC, carbon blacks as defined above have not previously been recommended for use as conductive blacks, but rather as pigments.

The amount of carbon black used in the CW compositions will generally be in the range of 6 to 40% by weight, with the precise amount required to obtain a particular resistivity at room temperature being dependent on the particular carbon black and the method used to disperse it in the polymer. The desired resistivity of the CW compositions at room temperature will depend upon the function of the electrical device of which it is part, from values as high as 10,000 ohm. cm., generally 1,000 to 8,000 ohm. cm., for strip heaters, to values as low as 0.3 ohm. cm. for other devices. When the carbon black has a particle size greater than 20 millimicrons and a surface area greater than 220 $m^2/g$, e.g. when the carbon black is Ketjenblack EC, the resistivity of the composition is preferably less than 1,000 ohm. cm., particularly less than 900 ohm. cm., especially less than 750 ohm. cm., e.g. less than 500 ohm. cm.

In the CW compositions, the ratio of the maximum resistivity in the temperature range from 25° to a temperature 50° C., preferably 40° C., below the melting point of the polymer to the resistivity at 25° C. is preferably less than 3, particularly less than 2, especially less than 1.5; this ratio can be less than 1, i.e. the composition can exhibit a negative temperature coefficient (NTC), but is generally at least 0.9. The teaching of the prior art is that conductive polymer compositions which are based on thermoplastic polymers, especially crystalline polymers, and which have resistivities in the range of 1 to 10,000 ohm. cm., will show a sharp increase in resistivity as the melting point of the polymer is approached, and if the composition is not cross-linked, will show a sharp decrease in resistivity when melting is complete. We have found that by using carbon blacks as defined above, the increase in resistivity around the melting point can be reduced and in some cases can be substantially eliminated. For particularly preferred CW compositions, the ratio of the maximum resistivity in the temperature range from 25° C. to the melting point of the polymer to the resistivity at 25° C. is less than 10, preferably less than 5, especially less than 2.

The present invention increases the range of base polymers and resistivities available in CW compositions. This in turn means that in devices comprising a conductive polymer PTC element and an adjacent conductive polymer CW element, the polymers in the two elements can be selected so that the contact resistance between the elements does not change excessively in use, eg. due to temperature variations which take place during operation of the device. We have found that for this purpose it is desirable that the polymers in the PTC and CW elements should be selected so that, if the elements are bonded directly to each other and are then separated from each other at room temperature, the bond fails by cohesive failure. One of the factors influencing changes in contact resistance is the relative melting points of the polymers, and in preferred devices of the invention the melting points of the first and second organic polymers differ by at most 25° C. Another factor is the type of polymer. Thus it is preferred that both polymers should be addition polymers, for example that both should comprise at least 50 molar percent of units derived from an olefin, especially ethylene or another $\alpha$-olefin, e.g. low or high density polyethylene, or that both should comprise units derived form vinylidene fluoride. Alternatively both can be polyesters or polyamides etc. The polymers are preferably crystalline, i.e. have a crystallinity of at least 1%, preferably at least 3%, especially at least 10%.

One class of polymers preferably used in the compositions are crystalline copolymers which consist essentially of units derived from at least one olefin, preferably ethylene, and at least 10% preferably not more than 30% by weight, based on the weight of the copolymer, of units derived from at least olefinically unsaturated comonomer containing a polar group, preferably vinyl acetate, an acrylate ester, e.g. methyl or ethyl acrylate, or acrylic or methacrylic acid. Another preferred class of polymers are crystalline polymers which comprise 50 to 100%, preferably 80 to 100%, by weight of —$CH_2CF_2$— or —$CH_2CHCl$— units, for example polyvinylidene fluoride or a copolymer of vinylidene fluoride, e.g. with tetrafluoroethylene.

The CW compositions used in this invention can contain one or more thermoplastic polymers, and can also contain one or more elastomers, usually in amount less than 20% by weight. When more than one thermoplastic polymer is present, the continuous phase can be provided by a single thermoplastic polymer or a mixture of two compatible thermoplastic polymers. The carbon black can be dispersed in the continuous phase only or, when the composition contains a discontinuous polymeric phase, in the discontinuous phase only or in both the continuous and discontinuous phases.

In preparing the CW compositions, any method which provides a satisfactory dispersion of the carbon black in the thermoplastic polymer can be used, but it should be noted that the electrical characteristics of the composition do depend on the method used. Preferably the carbon black is mixed with the molten polymer. The CW compositions preferably contain a small quantity of antioxidant, and this and any other desired ingredients can be added at the same time. The composition is shaped to the desired shape, e.g. by molding or extrusion. The shaped composition is preferably annealed, e.g. by heating to 150–200° C. for a period of 10 to 20 minutes, followed by cooling, two or more times until the resistivity reaches a stable value. If the composition is to be cross-linked, as is preferred, it is then cross-linked e.g. by irradiation or by heating to a temperature which activates a chemical cross-linking agent. Especially after cross-linking by irradiation, the shaped composition is preferably again annealed as described above.

The accompanying FIGS. 1–4 show the resistance-temperature characteristics of samples prepared from a number of CW compositions, the samples being 1-½×1×0.03 inch (3.8×2.5×0.075 cm.), with silver paint electrodes on both sides at two ends, and having been cut from slabs pressed from compositions obtained by mixing a carbon black with a molter polymer. The polymers and carbon blacks used and the amounts of carbon black (in % by weight of the composition) are given in the Table below. In each case the composition also contained a small amount of an appropriate radiation cross-linking agent and/or antioxidant and/or other stabilising agent. The Hytrel 4055 referred to in the Table is a block copolymer of polytetramethylene terephthalate and polytetramethylene oxides having about 50% crystallinity. The compositions were cross-linked by irradiation to the dosage given in the Table and were then given a heat treatment involving heating at 180° C.–200° C. for 15 to 20 minutes followed by cooling for 20 minutes, and repeating thus sequence until a stable resistance was obtained. In some cases, as noted in the Table, the compositions were given a similar heat treatment before being cross-linked.

Figure 3:
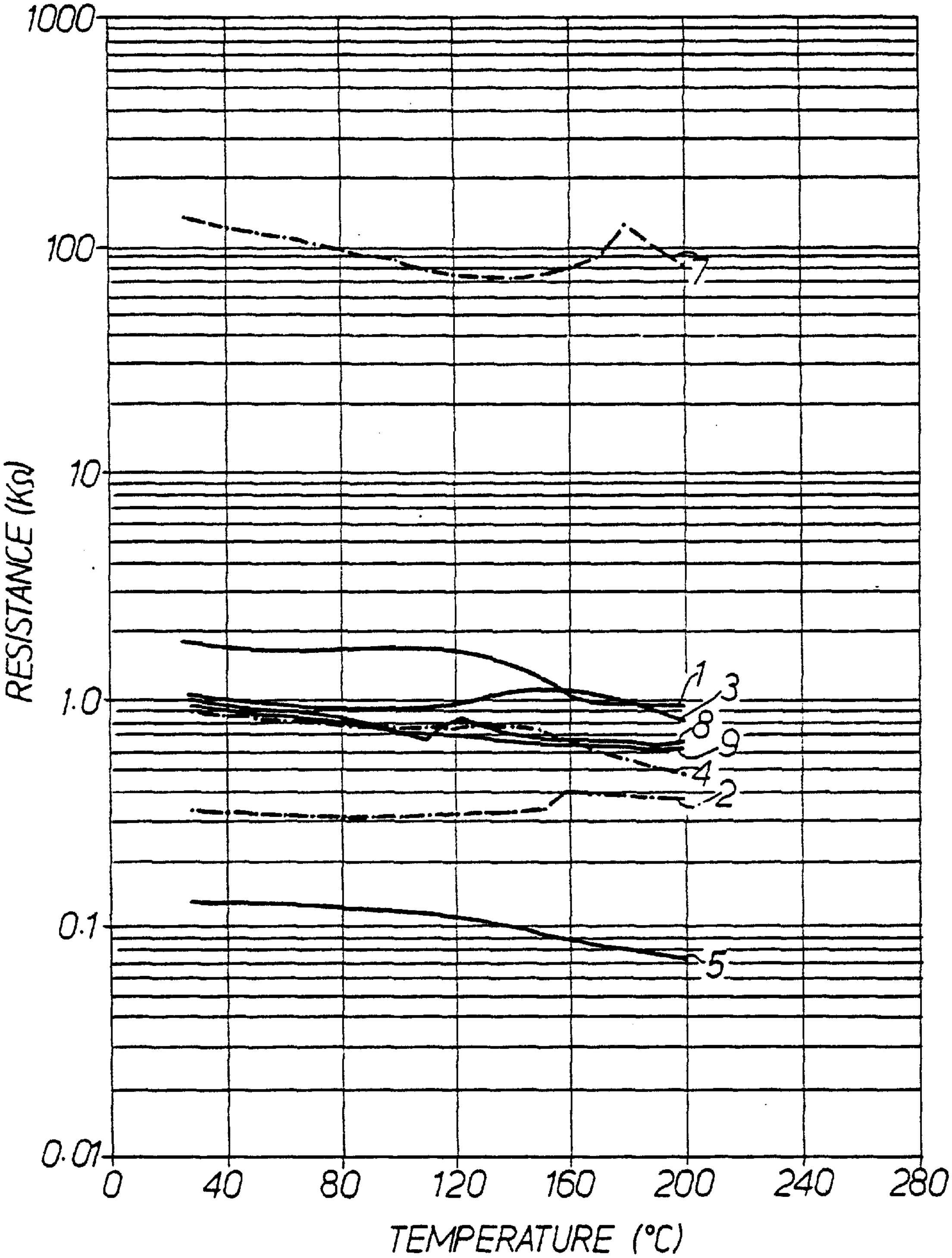
Figure 4:
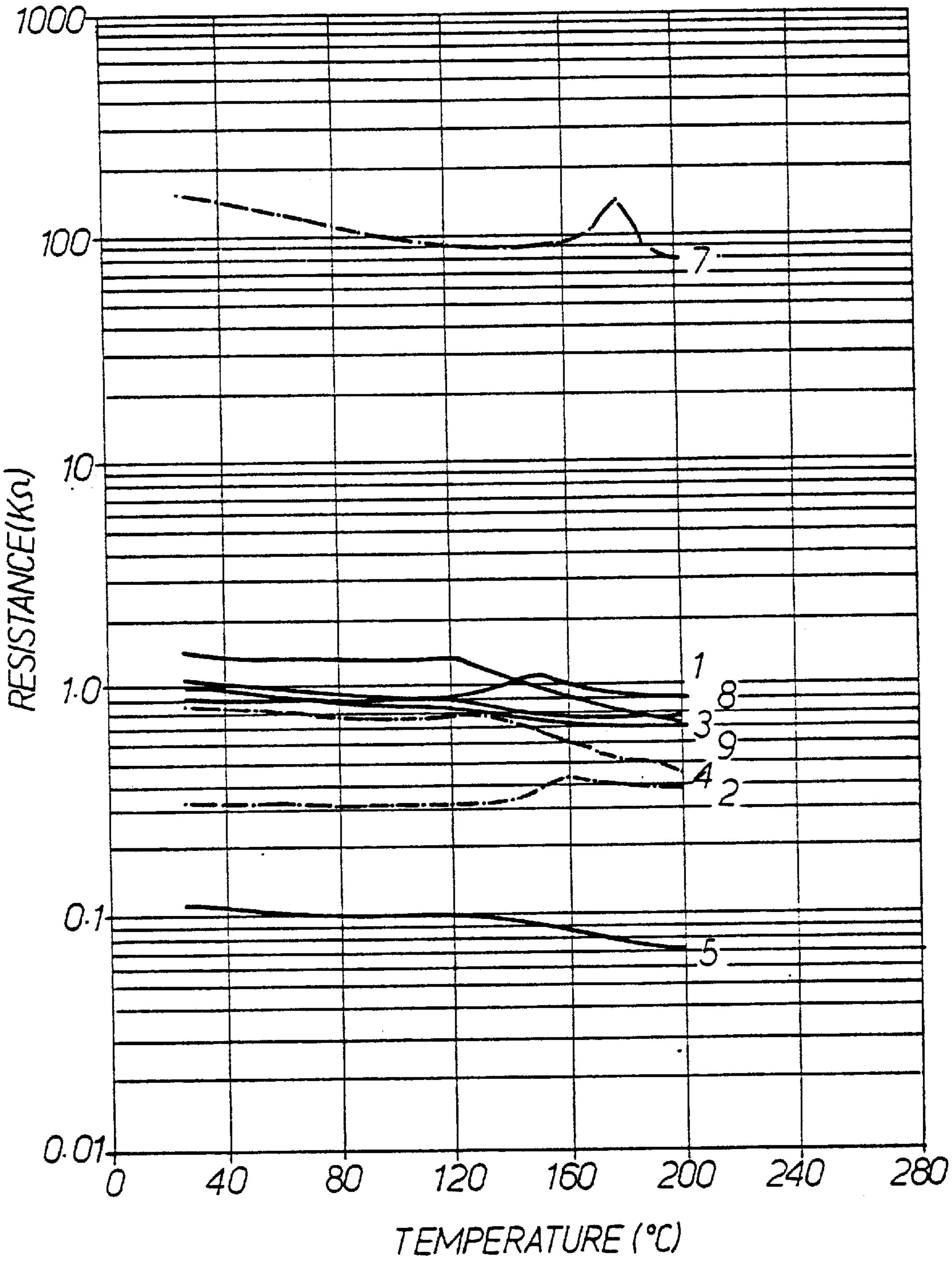

FIG. 4 shows the resistance/temperature curves of the samples used for FIG. 3 after they had been cooled back to room temperature; it will be seen that the compositions are very stable.

TABLE

| FIG. | Line | Polymer | Carbon Black Name | % | X-link Dose (Mrads) | Heat-treatment Before |
|---|---|---|---|---|---|---|
| 1 | 1 | high density polyethylene (Marlex 6003) | Royal Spectra | 20 | 5 | Yes |
| | 2 | high density polyethylene (Marlex 6003) | " | " | 5 | No |
| | 3 | high density polyethylene (Marlex 6003) | " | " | 10 | Yes |
| | 4 | high density polyethylene (Marlex 6003) | " | " | 10 | No |
| | 5 | high density polyethylene (Marlex 6003) | " | 30 | 20 | Yes |
| | 6 | high density polyethylene (Marlex 6003) | " | " | 20 | No |
| | 7 | high density polyethylene (Marlex 6003) | " | " | 40 | Yes |
| | 8 | high density polyethylene (Marlex 6003) | " | " | 40 | No |
| | 9 | high density polyethylene (Marlex 6003) | Monarch 1100 | 25 | 20 | No |
| | 10 | high density polyethylene (Marlex 6003) | " | " | 40 | Yes |
| | 11 | high density polyethylene (Marlex 6003) | " | " | 40 | No |
| 2 | 12 | high density polyethylene (Marlex 6003) | Ketjenblack EC | 10 | 5 | Yes |
| | 13 | high density polyethylene (Marlex 6003) | " | " | 5 | No |
| | 14 | high density polyethylene (Marlex 6003) | " | " | 10 | Yes |
| | 15 | high density polyethylene (Marlex 6003) | " | " | 10 | No |
| 3 & 4 | 1 | Polyvinyldidene fluoride (Kynar 461) | Raven 8000 | 13 | 10 | No |
| | 2 | Polyvinyldidene fluoride (Kynar 461) | " | 18 | 10 | No |
| | 3 | "Hytrel 4055" | " | 22 | 10 | No |
| | 4 | " | " | 22 | 10 | Yes |
| | 5 | " | " | 30 | 10 | Yes |
| | 7 | Nylon 11 | Royal Spectra | 18 | 10 | No |
| | 8 | Chlorinated polyethylene (CPE 2552) | " | 24 | 10 | Yes |
| | 9 | Chlorinated polyethylene (CPE 2552) | " | 24 | 10 | No |

EXAMPLE

A CW composition having a resistivity at 25° C. of about 115 ohm. cm. was prepared by blending 79 g. of high density polyethylene (Marlex 6003), 20 g. of Raven 8000 carbon black and 1 g. of an antioxidant on a 3 inch (7.5 cm.) electric roll mill at about 175° C. The resulting CW composition was granulated and a portion of it pressed into a slab 1 inch (2.5 cm) by 1 inch (2.5 cm.) by 0.061 inch (0.15 cm.), using a pressure of 10,000 psi (700 kg/cm$^2$) and a temperature of 205° C. One face of the slab was covered by a nickel mesh electrode (Delker 3 Ni 5-077) 1.1 inch (2.8 cm.) by 1 inch (2.5 cm.) by 0.003 inch (0.0075 cm.) and the electrode was impressed into the slab under the same pressing conditions.

A PTC composition was prepared by blending 54 g. of high density polyethylene, 44 g. of Furnex N 765 carbon black and 2 g. of an antioxidant in a Banbury mixer. The resulting PTC composition was granulated and a portion of it pressed into a slab 1 inch (2.5 cm.) by 1 inch (2.5 cm.) by 0.015 inch (0.04 cm.), using a pressure of 10,000 psi (700 kg/cm$^2$) and a temperature of 205° C. One face of the slab was covered by a nickel mesh electrode as described above and the electrode was impressed into the slab under the same pressing conditions.

Figure 5:
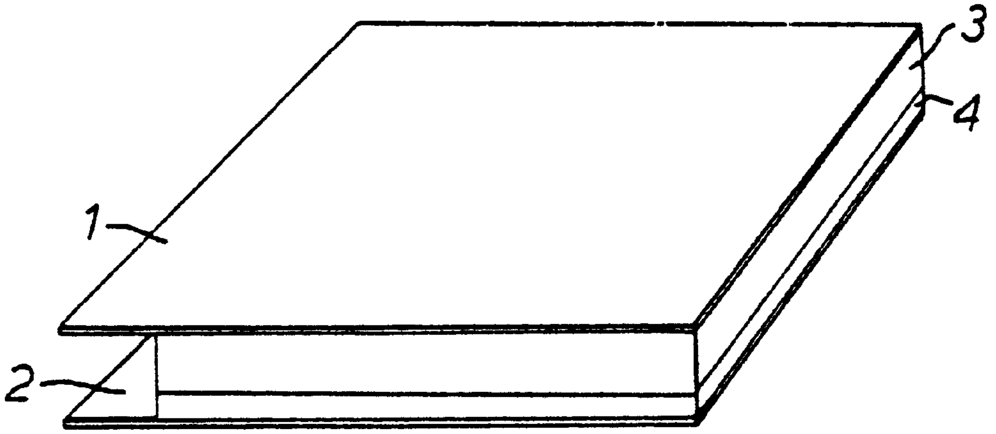
FIG. 5 shows a device according to the invention.

The CW slab and the PTC slab were then pressed together, with the electrodes on the outside using a pressure of 10,000 psi (700 kg/cm$^2$) and a temperature of 205° C. The composite structure thus formed was irradiated to a dosage of 20 megarad to cross-link the compositions, thus forming a heater which is suitable, for example, for maintaining a printed circuit or other electronic component at a desired elevated temperature. The finished heater is diagrammatically illustrate in FIG. 5 of the drawings, the electrodes being designated 1 and 2, the CW composition being designated 3 and the PTC composition being designated 4.

I claim:

1. A CW composition which (a) comprises (i) a continuous phase of a crystalline organic thermoplastic polymer and (ii), dispersed in said polymer, a conductive carbon black having a particle size (D) which is at most 15 millimicrons and a surface area (S) which is at least 300 m$^2$g; and (b) has a maximum resistivity in the temperature range from 25° C. to a temperature 40° C. below the melting point of said polymer which is less than 2 times its resistivity at 25° C.

2. A CW composition according to claim 1 which has a maximum resistivity in the temperature range from 25° C. to the melting point of the polymer which is less than 5 times its resistivity at 25° C.

3. A CW composition according to claim 1 which is cross-linked.

4. A CW composition according to claim 1 which contains 6 to 40% by weight of the carbon black and which has been prepared by a process which comprises mixing the carbon black with the molten polymer.

* * * * *